July 2, 1935. O. M. JAMES 2,007,124
STAVE BASKET AND MACHINE AND METHOD FOR MAKING SAME
Filed Sept. 14, 1933 5 Sheets-Sheet 1
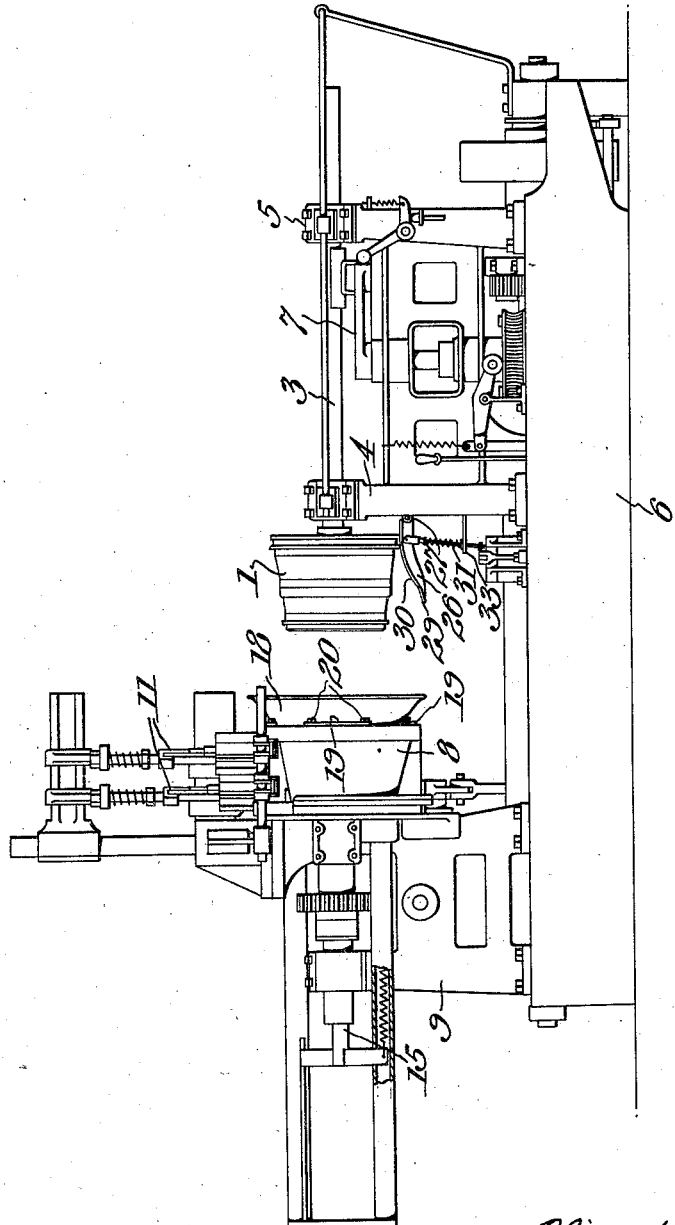

July 2, 1935.  O. M. JAMES  2,007,124
STAVE BASKET AND MACHINE AND METHOD FOR MAKING SAME
Filed Sept. 14, 1933  5 Sheets—Sheet 2
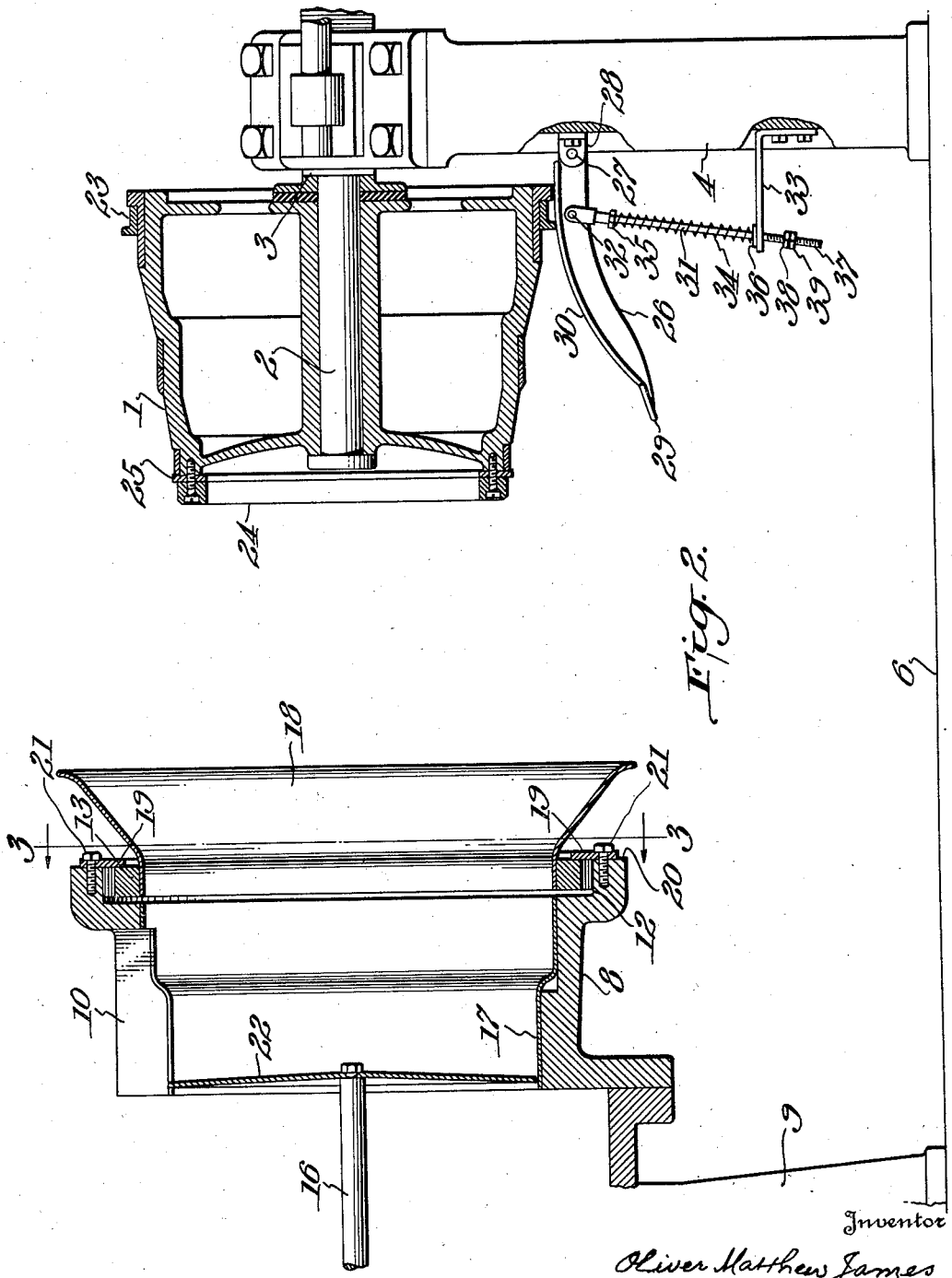

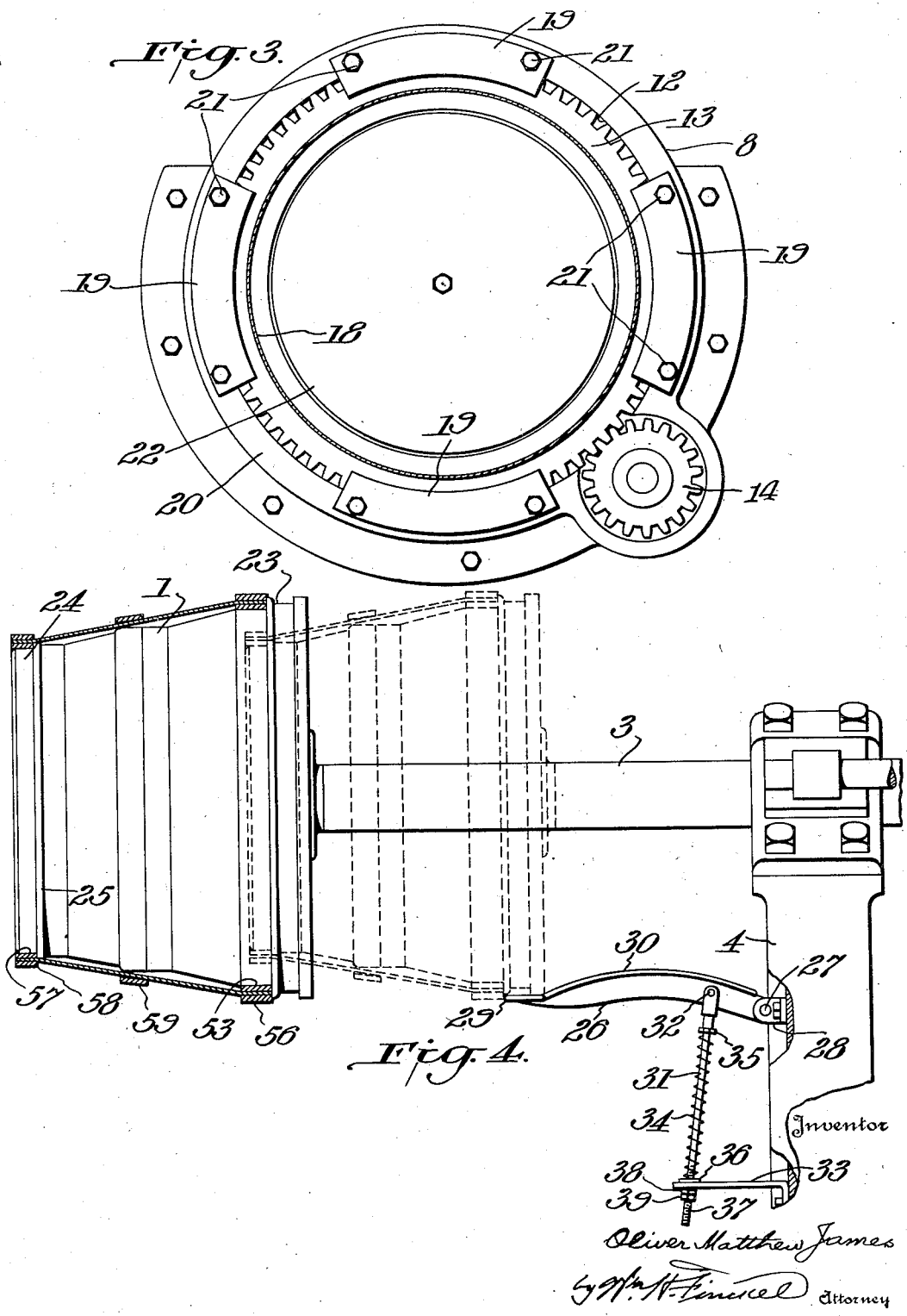

July 2, 1935.  O. M. JAMES  2,007,124
STAVE BASKET AND MACHINE AND METHOD FOR MAKING SAME
Filed Sept. 14, 1933  5 Sheets-Sheet 4

Inventor
Oliver Matthew James
Attorney

July 2, 1935. O. M. JAMES 2,007,124
STAVE BASKET AND MACHINE AND METHOD FOR MAKING SAME
Filed Sept. 14, 1933 5 Sheets-Sheet 5
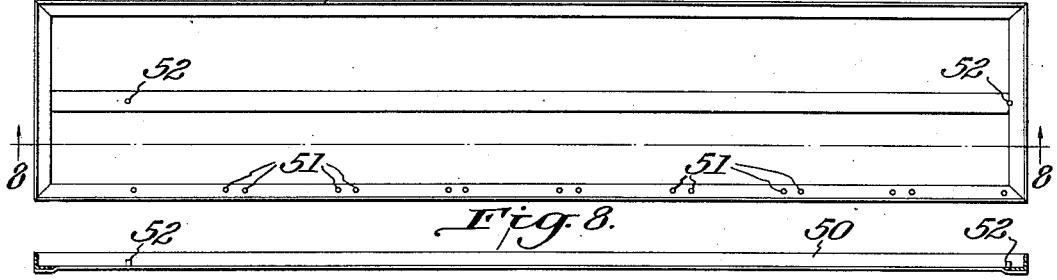
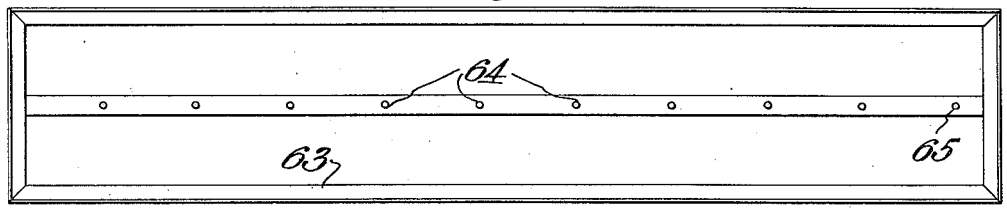
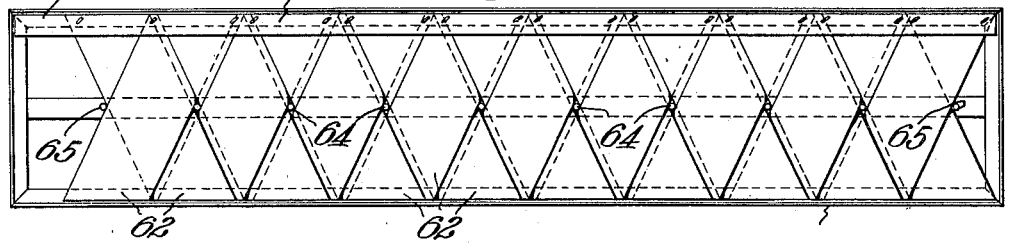
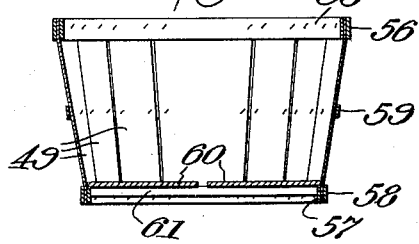 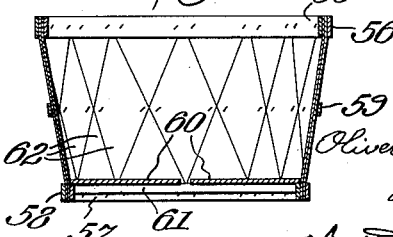
Inventor
Oliver Matthew James
by
W. H. Finnell
Attorney Patented July 2, 1935

2,007,124

UNITED STATES PATENT OFFICE 2,007,124

STAVE BASKET AND MACHINE AND METHOD FOR MAKING SAME

Oliver Matthew James, Dayton, Tenn., assignor to Dayton Veneer & Lumber Mills, Dayton, Tenn., a corporation of Tennessee Application September 14, 1933, Serial No. 689,465

18 Claims. (Cl. 147—47)

This invention relates to a method of making stave baskets, particularly stave baskets of what is known as the straight-side, raised-bottom type, such, for example, as that disclosed in the patent of Charles C. Davis, No. 1,805,687, granted May 19, 1931. The invention relates also, to machines for manufacturing such baskets, and particularly to attachments for known machines of the types disclosed generally in the patents of Albert H. Schmidtke, No. 1,752,856, granted April 1, 1930, and Edward Craig, No. 1,757,294, granted May 6, 1930, whereby such machines, which are designed primarily for the manufacture of what are known as continuous-stave baskets, may be adapted to the manufacture of the straight-side, raised-bottom type of baskets.

One object of the invention is to provide a method of manufacturing baskets of the straight-side, raised-bottom type referred to, whereby the operations of assembling the various parts comprising such baskets, and the operations of securing such parts together to form the completed baskets, exclusive of the bottoms thereof, are greatly simplified.

Another object of the invention is to provide machine attachments of the type referred to, whereby it is not only possible to adapt machines of the types mentioned to the manufacture of straight-side, raised-bottom baskets, but whereby the operation of such machines with the attachments applied may be simplified and their rate of production markedly increased, all as will be explained hereinafter more fully and finally claimed.

Figure 5:
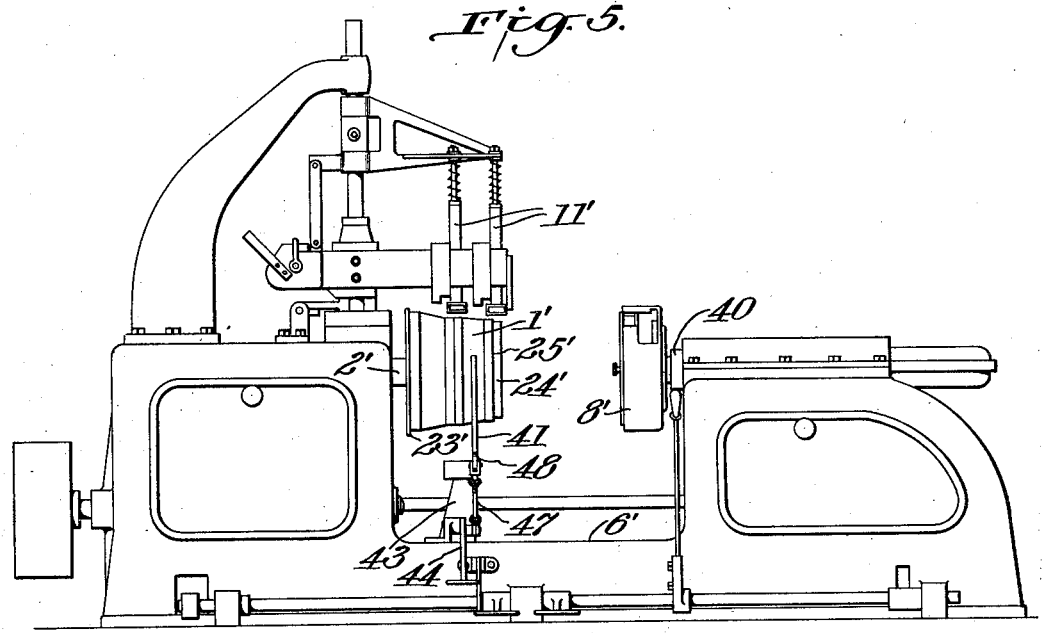
Figure 6:
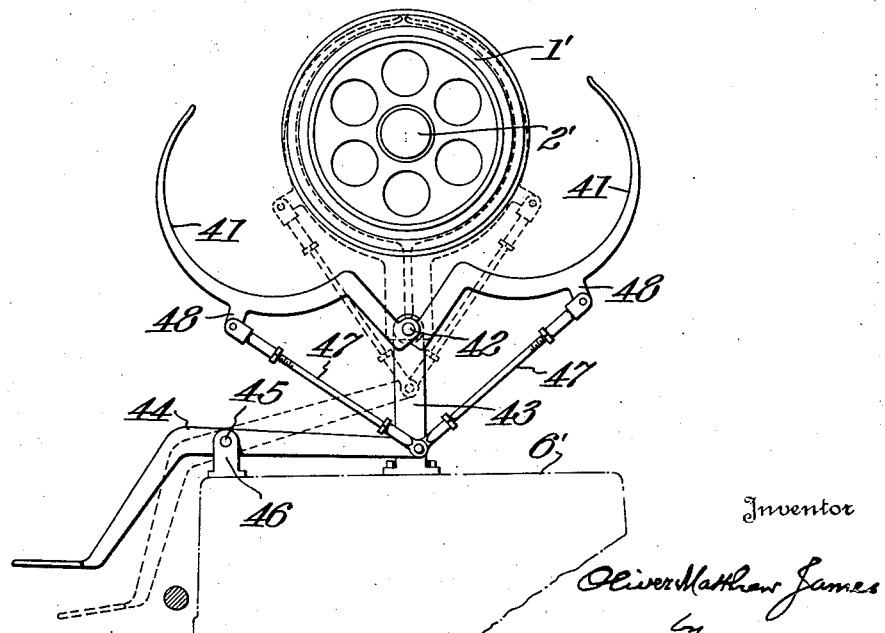

In the accompanying drawings illustrating the invention, in the several figures of which like parts are similarly designated, Figure 1 is a side elevation of one of the forms of machine hereinbefore referred to, with the attachments of the invention applied thereto. Fig. 2 is a fragmentary, enlarged, sectional elevation illustrating the mandrel and receptacle of the machine of Fig. 1. Fig. 3 is a sectional elevation taken substantially in the plane of line 3—3 of Fig. 2. Fig. 4 is an enlarged, side elevation of the mandrel and its support, and showing, in section, the completed side walls of a basket thereon. Fig. 5 is a side elevation of another type of machine, as hereinbefore referred to, showing the assembly therewith of attachments embodying the features of the invention. Fig. 6 is an enlarged end view of the mandrel of the machine illustrated in Fig. 5, and showing the modified attachments of the invention. Fig. 7 is a plan view of a templet suitable for positioning the stave members of a basket side wall in accordance with the method of the invention, and Fig. 8 is a section taken substantially on the line 8—8 of Fig. 7. Fig. 9 is a view of the templet of Fig. 7 but showing the basket staves arranged thereon and connected together by means of a hoop-forming member. Fig. 10 is a plan view of a modified form of templet. Fig. 11 illustrates the use of the templet of Fig. 10 in arranging and assembling the stave members of a woven wall basket in accordance with the method of the invention. Fig. 12 is a section of a straight-side, raised-bottom basket such as may be produced from the assembly of staves illustrated in Fig. 9. Fig. 13 is a section of a straight-side, raised-bottom basket such as may be formed from the assembly of stave members illustrated in Fig. 11.

The basket-forming machine illustrated in Fig. 1 is substantially of the type disclosed in the Craig patent hereinbefore referred to, and includes as operative parts a mandrel 1 axially and rotatably supported upon the cylindrical extension 2 (see Fig. 2) of a square axially slidable bar 3 mounted in fixed bearing members 4 and 5 upon a bed 6. Suitable operating mechanism 7 for axially sliding the bar 3 and with it the mandrel 1 is provided, and this mechanism is actuated in timed relation to the operation of the other cooperating parts of the machine. In axial alignment with the mandrel 1 is a receptacle 8 fixed upon a head 9 carried by the bed 6, and above this receptacle and operating through the slotted upper portion 10 thereof (see Fig. 2) are the stapling heads 11. The inner surface contour of the receptacle 8 is irregular to accommodate a basket to be formed therein, and it is provided at its outer open end with a bearing seat 12, in which is arranged a ring gear 13 driven by a pinion 14 and ordinarily adapted to engage the side wall of a basket being formed to rotate the same, and with it the mandrel 1, in order that hoop-forming members may be stapled to the basket sides by the stapling heads 11. Suitable spring-operated mechanism 15 automatically controlled in timed relation to the operation of the other parts of the machine, and embodying a stem 16, is provided for aiding in ejecting the finished basket from the receptacle along with the mandrel when the latter is retracted.

All of the parts of the machine thus far described are of common and well known form and such machines are in general use in the manufacture of continuous-stave baskets, as has been hereinbefore explained.

In order to adapt a machine of this type to the manufacture of straight-side, raised-bottom baskets, the interior of the receptacle 8 is provided with a sleeve 17 presenting only smooth curved contours upon its interior surface and serving to eliminate from the interior of the receptacle the uneven inner surface contour hereinbefore referred to. A flared or funnel-shaped member 18 is rigidly applied to the inner periphery of the ring gear 13, and instead of the customary outer receptacle extension which ordinarily is used to hold this ring gear in its bearing recess 12, a plurality of plates 19 are provided for this purpose, these plates being attached to the face of the flange 20 of the receptacle 8 by means of cap screws 21 or other appropriate fastenings. In place of the usual type of ejector carried by the stem 16, a convex circular disk 22 is applied thereto, and this disk is of a diameter sufficient to completely fill the annular cavity of the receptacle 8 as defined by the smallest diameter of the lining sleeve 17.

Ordinarily, in the formation of continuous-stave baskets, three stapling heads 11 are carried by the machine for the purpose of applying to the side-forming parts of the basket the three hoop-forming members customarily employed. In view of the fact, as will hereinafter appear, that, in accordance with the practice of the present invention, one set of hoops is applied to the side-forming staves prior to their introduction into the receptacle 8, only two stapling heads are retained in operation upon the machine, and these are arranged in the positions illustrated in Fig. 1.

In addition to the changes made in the receptacle, the partial formation of the side-forming portions of the basket, as just referred to, wherein the hoops forming the top rim of the basket are applied prior to the insertion of the staves into the receptacle, makes necessary modification of the mandrel, and in order that the mandrel and with it the partially completed side-forming portion of the basket may be inserted to an appropriate distance within the receptacle 8, an adapter ring 23 is applied to the rear or butt end of the mandrel, and an extension ring 24 and stop member 25 are applied to the leading end of the mandrel, the ring 24 and stop 25 serving, respectively, to receive and hold in proper location on the mandrel a preformed inner bottom hoop for the basket.

The sleeve 17, flared or funnel-shaped member 18, disk 22, adapter ring 23, hoop-holding extension ring 24, stop member 25, and their adjuncts, constitute the attachments which adapt the machine to the manufacture of straight-side, raised-bottom baskets.

During the basket-forming operation of machines of the type illustrated in Fig. 1, it will be understood that, as previously mentioned, the finished, side-forming portion of the basket is withdrawn from the receptacle 8 upon and in relatively tenacious frictional engagement with the mandrel 1. Ordinarily, in machines of this type, some means are provided for operating upon the basket at substantially the limit of the retractive stroke of the mandrel to break the frictional engagement of the basket therewith sufficiently to permit the basket to be easily removed from the mandrel. I have found that by releasing this frictional engagement at a point in the retractive stroke of the mandrel appreciably prior to the completion of such stroke, the speed of operation of the machine, and hence the rapidity of the production of baskets thereby, may be markedly increased. To this end, the invention contemplates the employment of a kick-off device which will function to break the frictional engagement between basket and mandrel just after the withdrawal of the basket from the receptacle. This kick-off device, the operation of which is particularly graphically exemplified in Fig. 4, includes an arm 26 pivotally supported at 27 in a bracket 28 secured to the bearing member 4, and having at its end remote from its pivotal connection a lip 29 preferably curved substantially to conform to the curvature of the butt end of the mandrel 1, and having upon its upper edge a cam surface 30 adapted to ride against the periphery of the butt end of the mandrel. For the purpose of maintaining this kick-off arm with its cam surface 30 in engagement with the periphery of the mandrel, I provide a rod 31 pivotally connected at 32 to the arm 26 and passing through a bracket 33 secured to the bearing member 4. This rod carries a spring 34 which bears at one end against the swivel connection 35 and at its other end against a washer 36 which rests upon the bracket 33. In order that the kick-off arm 26 may not rise too far under the influence of the spring 34 when the mandrel moves out of engagement with it, (as illustrated in full lines in Fig. 4) the end of the rod 31 is screwthreaded as indicated at 37 and is provided with adjustable stop and jam nuts 38 and 39, respectively, which will strike against the under side of the bracket 33 and thereby limit upward movement of the arm 26.

As will be seen from inspection of Fig. 4, when the arm 26 is in the position illustrated in this figure, its lip 29 will be in position to engage the outer top hoop of the basket upon retraction of the mandrel, as shown in broken lines, and as the retraction of the mandrel continues, the lip 29 will stop retraction of the basket with the mandrel and thus free it from frictional engagement therewith, and thereafter, during further retraction of the mandrel, the peripheral surface of the butt end of the mandrel will ride upon the cam surface 30 of the arm 26 to move the arm to the position illustrated in Figs. 1 and 2, wherein it is out of such position as will interfere with the initial basket-forming operations of the machine.

In the type of machine illustrated in Fig. 5, the mandrel 1' is axially stationary but rotatable upon a shaft 2', and the receptacle 8' is axially movable with the slide 40 so that it may be projected and retracted with respect to the mandrel 1' during the basket-forming operation.

Stapling heads 11' are provided. There are usually three of these stapling heads, as is the case in machines of the type just previously described, but due to the fact that, in the manufacture of baskets in accordance with this invention, the top hoops are applied prior to completion of the basket, as has been stated, only two of such stapling heads are used.

For the purpose of gathering the free ends of the stave members forming the basket sides around the mandrel 1' prior to projection of the receptacle 8', two similar arms 41 are provided; these arms being curved on their inner faces to substantially conform to the periphery of the mandrel, so that they will gather the staves about the mandrel in intimate relation thereto. These arms 41 are mounted upon a fixed pivot 42 carried by a bracket 43 rigidly secured to the machine bed 6', and are adapted to be closed about the mandrel by means of a pedal-operated lever 44 pivoted at 45 in a bracket 46 mounted upon the bed 6' and having its end connected by means of adjustable links 47 with ears 48 of the arms 41. Normally, the weight of the arms 41 and the links 47 will be sufficient to move the arms to open position as shown in full lines in Fig. 6, but, if desired, an appropriately arranged spring or the like may be employed for positively causing this opening operation.

Referring now to the method in which the various parts, including the stave members, hoop-forming members and bottom-forming members are assembled in the making of baskets in accordance with the invention, attention is directed particularly to Figs. 7 to 13 inclusive.

Assuming that stove members of the type illustrated in Figs. 9 and 12 are to be used in the formation of the basket, a plurality of these stave members 49, which are tapered from top to bottom so that their upper ends are wider than their lower ends, are arranged upon the templet 50 in such positions that they are in edge adjacent relation with their side edges substantially in contact adjacent to their upper ends and their lower ends held in appropriate spaced relation by means of pins 51. Inasmuch as it is necessary to have the row of stave members so arranged with respect to the templet that a free end may be provided for the hoop-forming member, next described, pins 52 are so positioned in the templet as to guide the operative in thus arranging the stave members. With the stave members arranged as described, a hoop-forming member 53 is laid upon them across their upper broad ends, as illustrated in Fig. 9, and having one of its ends 54 extending well past one end of the row of stave members to form an overlapping portion for the completion of the hoop. Then the templet with the stave members and hoop-forming member thus arranged is passed through a stapling machine and the staples 55 are applied through the hoop-forming member and stave members and are clinched against the underlying portion of the templet to secure the basket parts together.

The hoop-forming member 53 is preferably that which provides the inner top hoop of the basket, and it will be seen that, due to the manner in which the staples 55 are applied, there will be no clinched ends of same upon the inner surface of this top hoop, thus guarding against injury to the contents of the basket and to the hands of persons handling the basket and its contents.

After the assembly of stave members and hoop-forming member 53 is made as described, it is taken to a coiling machine of well known type where it is coiled to annular form and an outer hoop-forming member 56 arranged upon the outer faces of the stave members in substantial alignment with the hoop-forming member 53 and stapled thereto, the ends of the hoop members 53 and 56 being secured together to retain the assembled parts in annular form.

Assuming that a machine such as that illustrated in Figs. 1 to 4 is used to complete formation of this assembly of parts to basket shape, a preformed inner bottom hoop 57 is applied to the ring 24 in such position as to abut against the stop member 25, and then the assembly of stave members with the inner and outer top hoops coiled and secured in annular form, as described, is slipped over the mandrel 1 so that the top hoops which form the upper rim of the basket abut against the adapter 23, as illustrated in Fig. 4. It will be understood, however, that in Fig. 4, the side-wall forming portions of the basket are shown as completed, whereas when the assembly is first applied to the mandrel, the stave members will be in such position that they extend outwardly from the hoops 53 and 56 in substantial parallelism with the axis of the mandrel.

With the assembly of basket parts thus applied to the mandrel, the machine is operated to project the mandrel toward the receptacle 8, and as it is thus projected the free ends of the stave members will abut against the flared or funnel-shaped member 18 and will be gathered together thereby into intimate contact with the mandrel and be guided into the receptacle 8, sliding relatively freely thereinto, due to the inner surface contour of the sleeve 17. Inasmuch as the introduction of the stave members in this manner provides a desired frictional grip upon them of that portion of the flared member 18 which lies within the ring gear 13, the rotation of this ring gear and of the flared member 18 will cause the assembly of basket parts, and the mandrel, to rotate, and thus, when the hoop-forming members for the outer bottom hoop 58 and intermediate hoop 59 are fed into the machine in the usual manner they will be stapled in place, as is customary, by the stapling heads 11.

When the application of these additional hoops 57, 58 and 59 is completed, the mandrel 1 is retracted, and the disk 22, under the influence of the spring-pressed stem 16 which forms a part of the spring-operated mechanism 15, follows it in contact with the bottom hoops 57 and 58 a distance sufficient to cause the basket assembly to travel out of the receptacle in frictional engagement with the mandrel.

As hereinbefore described, when the mandrel is projected into the receptacle, the kick-off device 26 assumes the position shown in Fig. 4, and hence when the mandrel, during its retraction, reaches the position indicated in broken lines in Fig. 4, the lip 29 of the kick-off device will engage the outer top hoop 56 and will free the basket assembly from frictional engagement with the mandrel, as described, so that it may be taken off of same by the machine attendant.

Of course, the attendant has at hand a supply of the partially formed basket shell assemblies, so that when an assembly is taken from the mandrel another may immediately be applied thereto and the basket forming operation indefinitely repeated.

The side wall portion of the basket is thus completed, and the basket is finished by applying the bottom thereto. This bottom comprises two substantially semi-circular flat members or boards 60 stapled or otherwise affixed to a cross member 61, which latter is of a length substantially commensurate with the inside diameter of the bottom hoop 57, and the members 60 are so applied to it that they extend over its ends, as illustrated in Fig. 12. Thus, when this bottom-forming assembly is inserted into the side wall assembly from above, the cross member will pass down into the inner bottom hoop 57 and the members 60 will rest upon the upper edge of this bottom hoop. Then, by driving nails or the like fastenings through the bottom hoops 57 and 58 and into the ends of the cross member 61, the bottom may be secured in place.

In making a basket having its side walls of what may be termed woven formation, a plurality of stave members 62 of rhomboidal contour are placed upon the templet 63 in symmetrical interlaced or interlapped relationship and having their adjacent side edges suitably located by appropriately arranged pins 64. The assembly of stave members thus made is suitably positioned with respect to the templet by means of pins 65 so that the inner top-hoop forming member 66 may have a free end 67 for overlapping engagement when the assembly is coiled as is the case in the formation of baskets of the type just previously described. This hoop-forming member 66 is stapled in place in the same manner as the hoop-forming member 53 and this assembly is then coiled, shaped and hooped in the basket-forming machine as described in connection with the assembly illustrated in Fig. 9.

It will be noted, however, that when the assembly of basket-forming members provided as illustrated in Fig. 11 is formed to basket shape in the basket-forming machine, the gathering together of the free ends of the stave members, as accomplished by the flared member 18, operates to close the spaces between the adjacent side edges of the stave members to thus form side walls for the basket in which no openings are present, as illustrated in Fig. 13.

The bottom of this woven-wall basket, and its application, are the same as just described in relation to the basket illustrated in Fig. 12.

It will be noted that stave members of both of the forms referred to are of a vertical length between their parallel upper and lower edges substantially commensurate with the basket side walls.

Although I have shown in Figs. 7 to 11, and described, templets of substantially rigid form, adapted for arrangement of stave members and hoop-forming members for a single basket, it is to be understood that continuous belts or other continuous conveyors carrying appropriately arranged locating devices for the stave members thereon equivalent to the pins 51, 52, 64 and 65 may be substituted for the templets shown and particularly described, so that the initial basket assemblies may be made by a continuous operation and automatically or otherwise successively stapled and fed to a coiling machine.

In forming the basket assemblies to basket shape upon a machine such as that shown in Fig. 5, and provided with the attachments described, a preformed inner bottom hoop is applied to the ring 24' of the mandrel in such position as to abut against the stop shoulder 25', and then the coiled basket assembly is slipped on to the mandrel so that its top hoops abut against the rim 23'. Then the lever 44 is depressed by means of its pedal to engage the inner curved faces of the arms 41 with adjacent portions of the free ends of the stave members. Pressure being thus applied, the stave members will be gathered together about and in intimate contact with the mandrel. Then the receptacle 8' is projected toward the mandrel 1' and embraces the free ends of the staves, the arms 41 are released from engagement with the staves, and the operation of applying and stapling the outer bottom hoop and the intermediate hoop are completed in the customary manner.

It will thus be seen that, in accordance with the invention, a new method of forming straight-side, raised-bottom baskets is provided, and also that, by the provision of the attachments referred to, basket-forming machines of known types which are adapted primarily for production of continuous-stave baskets may be so modified as to adapt them to the formation of straight-side, raised-bottom baskets.

Moreover, the provision of the kick-off device makes possible increased efficiency of machines of the axially movable mandrel type, no matter whether these machines are employed in making continuous-stave baskets or straight-side, raised-bottom baskets.

Various changes and modifications are considered to be permissible within the spirit of the invention and the scope of the following claims.

What I claim is:—

1. A method of making the shells of stave baskets, which comprises the steps of arranging a plurality of stave members, having converging sides, in a row in edge-adjacent relation, attaching to said stave members adjacent to their wide ends a flat hoop member, coiling said hoop member and attached stave members to annular shape and securing the ends of said hoop member to retain such shape, thereafter gathering together the free narrow ends of said stave members so that they will form the sides of the basket, and attaching to the sides thus formed retaining hoops encompassing same.

2. A method of making the shells of stave baskets, which comprises the steps of arranging a plurality of stave members, having converging side edges, in a row in edge-adjacent relation, attaching to one face of said stave members adjacent to their wide ends a flat hoop member, coiling said hoop member and the stave members attached thereto to annular shape and simultaneously coiling and attaching thereto a hoop member arranged in juxtaposition to said other hoop member and upon the other face of said stave members and securing the ends of said hoop members to complete the formation of the top edge of the basket and retain the parts thus assembled in annular shape, thereafter gathering together the free narrow ends of the stave members about a preformed inner bottom hoop, and coiling and attaching an outer bottom hoop to said stave members and inner bottom hoop.

3. A method of making stave baskets, which comprises the steps of arranging a plurality of longitudinally tapered stave members in a row with their wide ends in substantial alignment and their side edges in divergent spaced relation adjacent to one another, attaching to one face of said stave members adjacent to their wide ends a flat hoop member, coiling and affixing said hoop member and the stave members attached thereto in annular shape with the side edges of the narrow ends of the stave members in spaced relation and securing the ends of said hoop member to retain such annular shape to thereby form a shell providing the top edge and side wall of the basket, thereafter gathering the free narrow ends of said stave members about a preformed inner bottom hoop, coiling and attaching an outer bottom hoop around said stave members in substantial alignment with said inner bottom hoop, and arranging within said basket a bottom-forming member supported by said inner bottom hoop.

4. A method of making the shells of stave baskets, which comprises the steps of arranging a plurality of stave members in a row in interlaced relation, attaching to said stave members adjacent to one of the ends thereof a flat hoop member, coiling said hoop member and the stave members attached thereto to annular shape and securing the ends of said hoop member to retain such annular shape, thereafter gathering together the free ends of said stave members to form the sides of the basket, such gathering operation serving to substantially close any spaces between the edges of adjacent stave members, and attaching securing hoops to the basket sides thus formed.

5. A method of making stave baskets, which comprises the steps of arranging a plurality of stave members in a row in interlaced relation, attaching to said stave members adjacent to one of the ends thereof a flat hoop member, coiling said hoop member and the stave members attached thereto to annular shape and securing the ends of said hoop member to retain such annular shape, thereafter gathering together the free ends of said stave members to form the sides of the basket, such gathering operation serving to substantially close any spaces between the edges of adjacent stave members, attaching interior and exterior bottom hoops to the free ends of said stave members, and applying a bottom within the basket and supported by said inner bottom hoop.

6. In a machine for making the shell of a stave basket from a blank composed of staves of a length substantially commensurate with the side wall of the basket and connected at one end by a hoop, a mandrel member having a substantially cylindrical portion to receive the hooped end of the blank, and a receptacle member, both of which include basket-engaging parts rotatable about their longitudinal axes, one of said members being axially slidable relatively to the other member to form the staves to basket shape and so retain them, and means forming a part of said machine and associated with the other said member for engagement with said staves opposite to their hooped ends to thereby gather the staves together during relative axial sliding movement of said members so that the two members may cooperate to form the basket shell.

7. In a machine for making the shell of a stave basket from a blank composed of staves of a length substantially commensurate with the side wall of the basket and connected at one end by a hoop, an axially slidable and rotatable mandrel member having a substantially cylindrical portion to receive the hooped end of the blank, and an axially stationary receptacle member, said members cooperative to complete the formation of the partially formed basket sides, said receptacle member provided with a rotatable flaring stave-guiding member for engagement with the ends of the staves opposite to their hooped ends and adapted to gather the same within the receptacle member to basket form about said mandrel member during axial movement of the mandrel member toward the receptacle member.

8. Apparatus as claimed in claim 7, in which the rotatable flaring stave-guiding member is mounted upon a positively driven ring gear carried by the receptacle member.

9. Attachments for a machine for making baskets of the continuous stave type whereby such machine may be adapted to the manufacture of baskets from blanks of the type in which the staves are of a length substantially commensurate with the side walls of the basket and are connected at one end by a hoop, said machine including a rotatable mandrel member provided with a substantially cylindrical portion for supporting the hooped end of the blank and a receptacle member one of which is axially movable relatively to the other, said attachments comprising means forming a part of said machine for engagement with the ends of the staves to thereby gather the staves about the mandrel member for introduction into the receptacle member.

10. Attachments for a machine for making baskets of the continuous stave type whereby such machine may be adapted to the manufacture of baskets of the type in which staves of a length substantially commensurate with the side walls of the basket are used, said machine including a receptacle member of uneven interior surface contour and a positively rotated part, said attachments comprising a sleeve arranged within said receptacle and adapted to modify the uneven interior surface contour thereof, and a flared annular member connected with said rotated part and rotatable therewith.

11. Apparatus as claimed in claim 10, in which the rotated part is a positively driven ring gear.

12. In a machine for making stave baskets having side walls composed of staves of a length substantially commensurate with said side walls, a rotatable mandrel member and a receptacle member relatively axially movable, and means associated with said mandrel member and movable substantially radially with respect thereto for compressing said staves therearound and gathering them together for introduction into said receptacle member.

13. In a machine for making stave baskets having side walls composed of staves of a length substantially commensurate with said side walls, a rotatable mandrel member and a receptacle member relatively axially movable, and means associated with said mandrel member including arms movable with respect to the periphery of said mandrel member for compressing said staves therearound and gathering them together for introduction into said receptacle member.

14. In a machine for making stave baskets having side walls composed of staves of a length substantially commensurate with said side walls, a rotatable mandrel member and a receptacle member relatively axially movable, and means associated with said mandrel member including arms curved to substantially conform to the periphery of said mandrel member and pivoted for movement with respect thereto for compressing said staves therearound and gathering them together for introduction into said receptacle member.

15. In a machine for making stave baskets having side walls composed of staves of a length substantially commensurate with said side walls, a rotatable mandrel member and a receptacle member relatively axially movable, and means associated with said mandrel member including arms curved to substantially conform to the periphery of said mandrel member and pivoted for movement with respect thereto for compressing said staves therearound and gathering them together for introduction into said receptacle member, and means for imparting the desired movement to said arms.

16. In a machine for making stave baskets, an axially projectable and retractable mandrel, and a receptacle, the mandrel and receptacle so cooperating in the basket making operation that the basket is withdrawn from the receptacle upon the mandrel, and means normally held by said mandrel out of basket-engaging position but acting to release the basket from the mandrel during retraction thereof.

17. In a machine for making stave baskets, an axially projectable and retractable mandrel, and a receptacle, the mandrel and receptacle so cooperating in the basket making operation that the basket is withdrawn from the receptacle upon the mandrel, and means fixed with respect to the axial movement of said mandrel and normally held by said mandrel out of basket-engaging position but acting to release the basket from the mandrel prior to complete retraction of the mandrel.

18. In a machine for making stave baskets, an axially projectable and retractable mandrel, and a receptacle, the mandrel and receptacle so cooperating in the basket making operation that the basket is withdrawn from the receptacle upon the mandrel, and a kick-off device for releasing the basket from the mandrel during retraction of same, including a lever fixed with respect to the axis of said mandrel but movable radially relatively thereto, said lever provided with a lip for engagement with the basket rim and having a cam surface for cooperation with the periphery of said mandrel, and means for normally holding said cam surface in contact with said periphery.

OLIVER MATTHEW JAMES.